US009742162B2

(12) United States Patent
Roessler et al.

(10) Patent No.: US 9,742,162 B2
(45) Date of Patent: Aug. 22, 2017

(54) GAS-INSULATED MEDIUM-VOLTAGE SWITCHGEAR ASSEMBLY

(71) Applicant: Siemens Aktiengesellschaft, München (DE)

(72) Inventors: Andreas Roessler, Fernwald (DE); Stefan Stenger, Eschau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 9 days.

(21) Appl. No.: 14/897,257

(22) PCT Filed: Jun. 3, 2014

(86) PCT No.: PCT/EP2014/061448
§ 371 (c)(1),
(2) Date: Dec. 10, 2015

(87) PCT Pub. No.: WO2014/202379
PCT Pub. Date: Dec. 24, 2014

(65) Prior Publication Data
US 2016/0134086 A1 May 12, 2016

(30) Foreign Application Priority Data

Jun. 18, 2013 (DE) ......................... 10 2013 211 341

(51) Int. Cl.
*H02B 1/20* (2006.01)
*H02B 1/26* (2006.01)
(Continued)

(52) U.S. Cl.
CPC ............. *H02B 1/16* (2013.01); *H02B 13/075* (2013.01); *H02B 13/045* (2013.01)

(58) Field of Classification Search
CPC .... H01R 25/162; H01R 13/453; H01R 33/06; H02B 1/16; H02B 13/075; H02B 13/045
(Continued)

(56) References Cited

U.S. PATENT DOCUMENTS 4,250,535 A    2/1981 Adolph et al.
5,003,427 A *  3/1991 Reichl ................ H02B 13/0354
                                              361/612
(Continued)

FOREIGN PATENT DOCUMENTS

CN     1273687 A      11/2000
CN    201163710 Y     12/2008
(Continued)

OTHER PUBLICATIONS

Chinese Office Action dated Jul. 6, 2016.
(Continued)

*Primary Examiner* — Anthony Haughton
(74) *Attorney, Agent, or Firm* — Harness, Dickey & Pierce, P.L.C.

(57) ABSTRACT

In order to develop a gas-insulated medium-voltage switchgear assembly, which has an encapsulated container for accommodating components of the medium-voltage switchgear assembly, a grounding contact and a grounding busbar terminal provided on the outer side of the container, such that it has a simple and economical design, it is proposed that the grounding contact is secured by integral bonding in a container opening and has the grounding busbar connection terminal.

8 Claims, 2 Drawing Sheets

(51) Int. Cl.
*H02B 1/16* (2006.01)
*H02B 13/075* (2006.01)
*H02B 13/045* (2006.01)

(58) Field of Classification Search
USPC .................. 361/611, 612, 624, 637, 648
See application file for complete search history.

(56) References Cited

U.S. PATENT DOCUMENTS

| | | | |
|---|---|---|---|
| 5,715,134 | A | 2/1998 | Maineult et al. |
| 5,902,979 | A | 5/1999 | Kim |
| 6,335,502 | B1 | 1/2002 | Kikukawa et al. |
| 7,943,881 | B2 * | 5/2011 | Gimeno ............... H01H 31/003 218/78 |
| 2012/0092847 | A1 | 4/2012 | Jecke et al. |

FOREIGN PATENT DOCUMENTS

| | | | |
|---|---|---|---|
| CN | 102237193 | A | 11/2011 |
| CN | 102576622 | A | 7/2012 |
| CN | 202696041 | U | 1/2013 |
| DE | 3133982 | A1 | 3/1983 |
| DE | 3715053 | A1 | 11/1988 |
| DE | 19850430 | A1 | 7/1999 |
| DE | 10217921 | A1 | 10/2002 |
| DE | 10219055 | A1 | 11/2003 |
| DE | 102009030610 | A1 | 12/2010 |
| EP | 0005208 | A1 | 11/1979 |
| EP | 0291762 | A2 | 11/1988 |
| EP | 1068624 | A1 | 1/2001 |
| EP | 1251614 | A2 | 10/2002 |
| EP | 1928065 | A1 | 6/2008 |
| WO | WO-2011045043 | A1 | 4/2011 |
| WO | WO-2012077963 | A1 | 6/2012 |

OTHER PUBLICATIONS

International Search Report PCT/ISA/210 for International Application No. PCT/EP2014/061448 dated Aug. 11, 2014.
Written Opinion of the International Searching Authority PCT/ISA/237 for International Application No. PCT/EP2014/061448 dated Aug. 11, 2014.

* cited by examiner

US 9,742,162 B2

GAS-INSULATED MEDIUM-VOLTAGE SWITCHGEAR ASSEMBLY

PRIORITY STATEMENT

This application is the national phase under 35 U.S.C. §371 of PCT International Application No. PCT/EP2014/061448 which has an International filing date of Jun. 3, 2014, which designated the United States of America and which claims priority to German patent application number DE 102013211341.2 filed Jun. 18, 2013, the entire contents of which are hereby incorporated herein by reference.

FIELD

An embodiment of the invention generally relates to a gas-insulated medium-voltage switchgear assembly with an encapsulated container for receiving components of the medium-voltage switchgear assembly, with a grounding contact and a grounding busbar terminal arranged on an outer side of the container.

BACKGROUND

Such a gas-insulated medium-voltage switchgear assembly is known from the common prior art and comprises an encapsulated, gastight container for receiving components of the medium-voltage switchgear assembly, such as for example busbars, circuit breakers, current transformers or the like, the gas-insulated container being filled for example with SF6 as the insulating gas. Such switchgear assemblies have as further components a grounding switch, in the case of which a moving grounding contact, which is in conducting connection with the components of the medium-voltage switchgear assembly, is moved in the case where grounding has to be carried out in such a way that it is connected to a grounding contact in an electrically conducting manner, which grounding contact is connected by way of the grounding busbar terminal to ground potential. In the case of the switchgear assemblies known from the common prior art, this is achieved for example by the grounding contact being screwed to the container wall inside the gastight container, while the grounding busbar terminal is secured, for example screwed, to the outside of the gastight container, so that the grounding of the grounding contact arranged in the gastight container takes place by way of the gastight container and the grounding busbar terminal.

SUMMARY

An embodiment of the present invention is directed to a gas-insulated medium-voltage switchgear assembly that is of a simple and low-cost structural design.

An embodiment of the present invention is directed to a gas-insulated medium-voltage switchgear assembly wherein the grounding contact is secured by integral bonding in a container opening, including the grounding busbar terminal.

BRIEF DESCRIPTION OF THE DRAWINGS

The invention is explained in more detail below on the basis of an example embodiment and the drawings.

DETAILED DESCRIPTION OF THE EXAMPLE EMBODIMENTS

Figure 1:
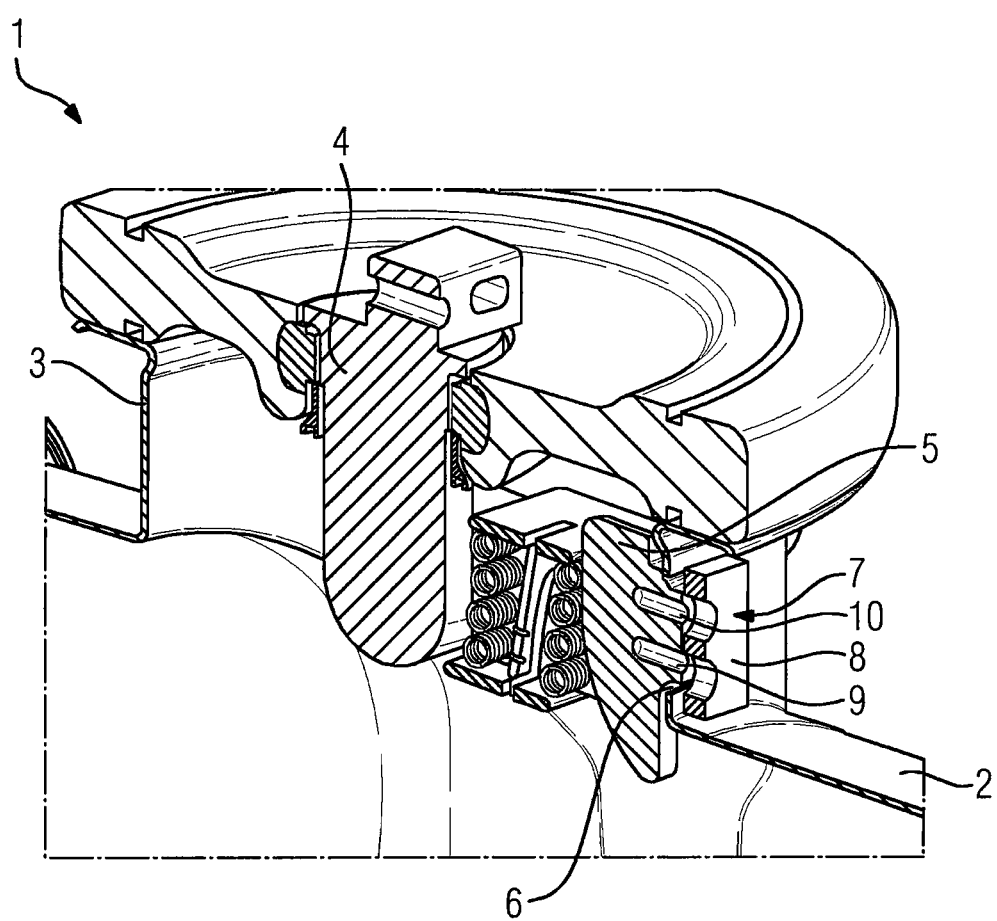
FIG. 1 shows a three-dimensional schematic partial view of an example embodiment of a gas-insulated medium-voltage switchgear assembly according to the invention.
Figure 2:
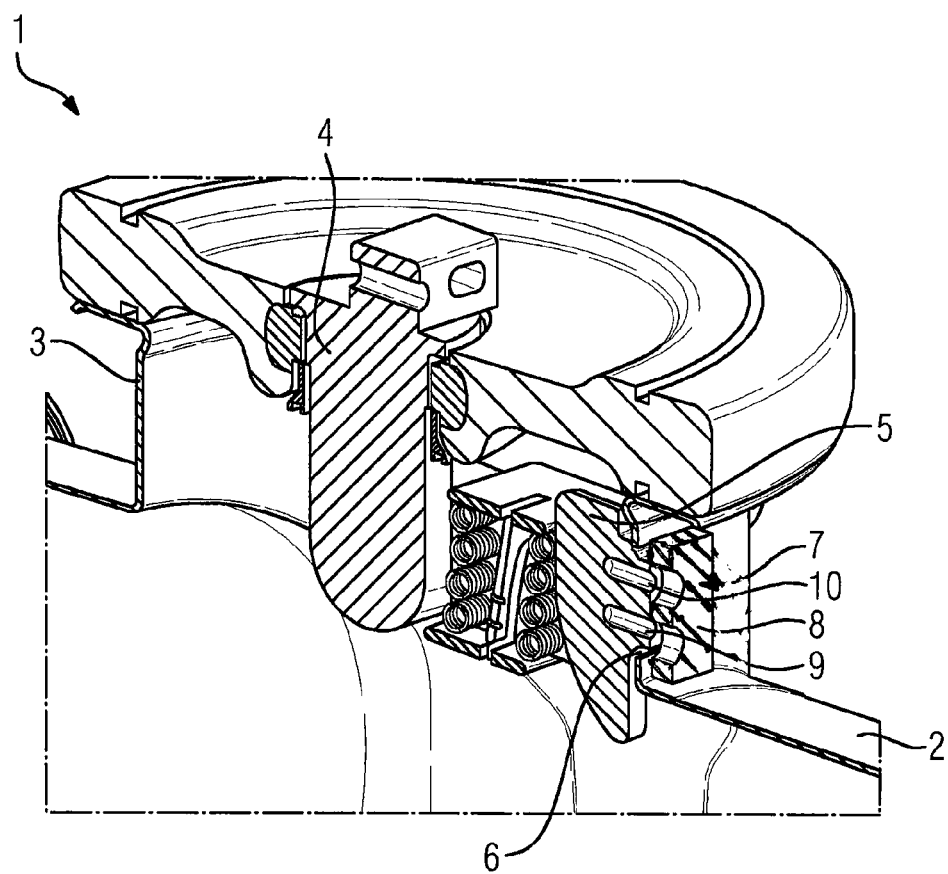
FIG. 2 shows a three-dimensional schematic partial view of an example embodiment of a gas-insulated medium-voltage switchgear assembly according to the invention.

An embodiment of the present invention is directed to a gas-insulated medium-voltage switchgear assembly wherein the grounding contact is secured by integral bonding in a container opening, including the grounding busbar terminal.

In other words, in the case of the gas-insulated medium-voltage switchgear assembly according to an embodiment of the invention, the grounding contact is formed in one piece with the grounding busbar terminal and secured by integral bonding in a container opening of the encapsulated container of the gas-insulated medium-voltage switchgear assembly, to be precise in such a way that the integrally bonded securement of the grounding contact in the container opening has the effect that it is sealed in a gastight manner, the grounding busbar terminal of the grounding contact being arranged on the outer side of the gastight container and the grounding contact itself being arranged inside the gastight container. The integrally bonded securement of such a grounding contact with a grounding busbar terminal in such a container opening therefore reduces the effort that securing involves in comparison with the solution known from the common prior art with a separate grounding contact, which is secured inside the container and a separate grounding busbar terminal, which has to be secured on the outer side of the container.

In an advantageous refinement of an embodiment of the invention, the grounding busbar terminal is formed by at least one blind-hole bore arranged in a planar surface of the grounding contact that is arranged on the outer side. One or more blind-hole bores provide a suitable easy way of securing a grounding busbar to the grounding busbar terminal, the gastightness of the overall arrangement also being ensured in an easy way by the blind holes in the planar surface of the grounding contact.

In a particularly advantageous refinement of an embodiment of the invention, the integrally bonded connection is a brazed or a welded connection. Brazing or welding are simple, low-cost methods for securing such a grounding contact by integral bonding to a grounding busbar terminal in a gastight, encapsulated container of such a medium-voltage switchgear assembly.

The figure shows a partially schematic sectional view through a gas-insulated medium-voltage switchgear assembly 1 with a gastight, encapsulated container 2, in which components of the medium-voltage switchgear assembly that are not graphically represented any further, such as for example busbars, switching devices such as circuit breakers or disconnectors or grounding switches, transformers or cable terminals, are arranged, the gastight encapsulated container 2 being filled with SF6 as the insulating gas.

The gastight container 2 has a flange 3, through which a conducting connection 4 extends, for example in order to transfer the current that is to be distributed by way of the gas-insulated medium-voltage switchgear assembly 1 into another functional region of the gas-insulated medium-voltage switchgear assembly. A grounding contact 5 is secured by integral bonding in a container opening 6 of the gastight encapsulated container 2, for example by brazing or welding, so that the container opening 6 is in turn sealed in a gastight manner by the integrally bonded grounding contact 5 secured in the container opening 6 and an escape of gas from the interior space of the container 2 to the outside is reliably prevented. The grounding contact 5 consequently extends from the interior space of the container 2 to the outside and has on an outer side of the container a grounding busbar terminal 7, which is formed by a planar surface 8, which in the exemplary embodiment is provided with two blind-hole bores 9 and 10, which blind-hole bores 9 and 10 are provided for securing a grounding busbar that is not graphically represented.

A moving contact, which is likewise not graphically shown any further, is arranged in the interior of the encapsulated container and is movable by means of a drive unit, is brought into conducting connection with the grounding contact 5 in the case where grounding is necessary, so that the grounding of the components of the medium-voltage switchgear assembly is made possible by way of the grounding contact 5 and the grounding busbar terminal 7 in connection with the grounding busbar that is not graphically represented.

LIST OF DESIGNATIONS

1 gas-insulated medium-voltage switchgear assembly
2 encapsulated container
3 flange
4 conducting connection
5 grounding contact
6 container opening
7 grounding busbar terminal
8 planar surface
9,10 blind-hole bores

The invention claimed is:

1. A gas-insulated medium-voltage switchgear assembly, comprising:
   an encapsulated container to receive components of the medium-voltage switchgear assembly; and
   a grounding contact and a grounding busbar terminal arranged on an outer side of the encapsulated container, the grounding contact being secured to the encapsulated container by integral bonding in an opening of the encapsulated container, the opening of the encapsulated container further including the grounding busbar terminal, wherein the integrally bonded connection is a brazed or a welded connection.

2. The gas-insulated medium-voltage switchgear assembly of claim 1, wherein the grounding busbar terminal is formed by at least one blind-hole bore arranged in a planar surface of the grounding contact arranged on the outer side.

3. The gas-insulated medium-voltage switchgear assembly of claim 1, wherein the grounding contact is integrally formed with the grounding busbar terminal and secured by integral bonding in the container opening of the encapsulated container.

4. The gas-insulated medium-voltage switchgear assembly of claim 1, wherein the grounding contact is integrally formed in one piece with the grounding busbar terminal.

5. The gas-insulated medium-voltage switchgear assembly of claim 3, wherein the grounding busbar terminal is formed by at least one blind-hole bore arranged in a planar surface of the grounding contact arranged on the outer side.

6. The gas-insulated medium-voltage switchgear assembly of claim 1, wherein the grounding terminal busbar is in direct contact with the encapsulated container.

7. The gas-insulated medium-voltage switchgear assembly of claim 1, wherein the opening is formed in a flange of the encapsulated container.

8. The gas-insulated medium-voltage switchgear assembly of claim 1, wherein the grounding contact does not extend through the opening of the encapsulated container.

* * * * *